United States Patent [19]

Hill et al.

[11] Patent Number: 5,330,031
[45] Date of Patent: Jul. 19, 1994

[54] ALTERNATIVE FUEL SYSTEM FOR POWERED INDUSTRIAL VEHICLE

[75] Inventors: Tom W. Hill, Lexington, Ky.; Bryan S. Memmott, Martinsburg, W. Va.

[73] Assignee: Clark Material Handling Company, Lexington, Ky.

[21] Appl. No.: 860,536

[22] Filed: Mar. 30, 1992

[51] Int. Cl.⁵ .................... B60K 28/00; B60K 15/00; F02B 43/02
[52] U.S. Cl. ................... 180/271; 180/69.5; 280/834; 123/527; 137/340; 137/505.12; 141/348
[58] Field of Search .............. 280/834; 180/271, 69.4, 180/69.5; 123/527; 137/340, 505.12; 141/348, 349, 350; 220/724, 726, 727

[56] References Cited

U.S. PATENT DOCUMENTS

| | | |
|---|---|---|
| 2,895,560 | 7/1959 | Lynn .................... 180/69.5 |
| 3,831,802 | 8/1974 | Chambers et al. ............. 220/727 X |
| 4,492,208 | 1/1985 | Lent .................... 123/527 |
| 4,497,304 | 2/1985 | Wintrell et al. ............. 123/527 |
| 4,501,253 | 2/1985 | Gerstmann et al. ............. 123/527 |
| 4,522,159 | 6/1985 | Engel et al. ............. 123/527 X |
| 4,688,537 | 8/1987 | Calkins et al. ............. 123/527 |
| 4,811,720 | 3/1989 | Katumata et al. ............. 123/527 |
| 4,898,205 | 2/1990 | Ross ............. 137/505.12 |
| 4,919,174 | 4/1990 | Warland ............. 141/348 X |
| 5,107,906 | 4/1992 | Swenson et al. ............. 141/11 |
| 5,111,838 | 5/1992 | Langston ............. 141/348 X |
| 5,160,065 | 11/1992 | Libes et al. ............. 220/724 |
| 5,188,155 | 2/1993 | Kremer ............. 141/348 X |

FOREIGN PATENT DOCUMENTS

| | | | |
|---|---|---|---|
| 0514045 | 5/1954 | Belgium ............. | 220/724 |
| 0665849 | 7/1964 | Italy ............. | 220/724 |

OTHER PUBLICATIONS

Five black/white photocopies of 3×5 color photos showing a CNG conversion on a Clark forklift truck by Material Handling Equipment Company, 7433 U.S. 30 East, Ft. Wayne, Ind. 46803 (Sep. 7, 19990).

Primary Examiner—Brian L. Johnson
Assistant Examiner—Florian Zeender

[57] ABSTRACT

An alternative fuel system and compressed natural gas (CNG) conversion kit, primarily for smaller size industrial vehicles, such as compact loaders and lift trucks restricted in the space available in the engine compartment for the components of a CNG system where the vehicle was initially engineered for other fuel systems such as gasoline liquid petroleum gas (LPG) or diesel fuel having substantially fewer parts and components and less complex systems. A CNG tank is mounted horizontally outside of the engine compartment and a high pressure line connects from the tank to a regulator mounted inside the engine compartment for decompressing the gas to a pressure suitable for mixing with air in the carburetor of the engine. The CNG system has a refilling receptacle with an electrical interlock to the ignition preventing accidental drive-away. Within the engine compartment, a mounting arrangement takes advantage of limited space and more efficiently transmits heat from the engine cooling system to counteract the refrigeration effect due to gas decompression in the components of the system. The arrangement outside the engine compartment utilizes guarding structures to protect the high pressure lines, valves, and fittings from damage, including taking advantage of the existing vehicle structure to prevent damage from hazards in the workplace during normal operation of the vehicle.

12 Claims, 4 Drawing Sheets

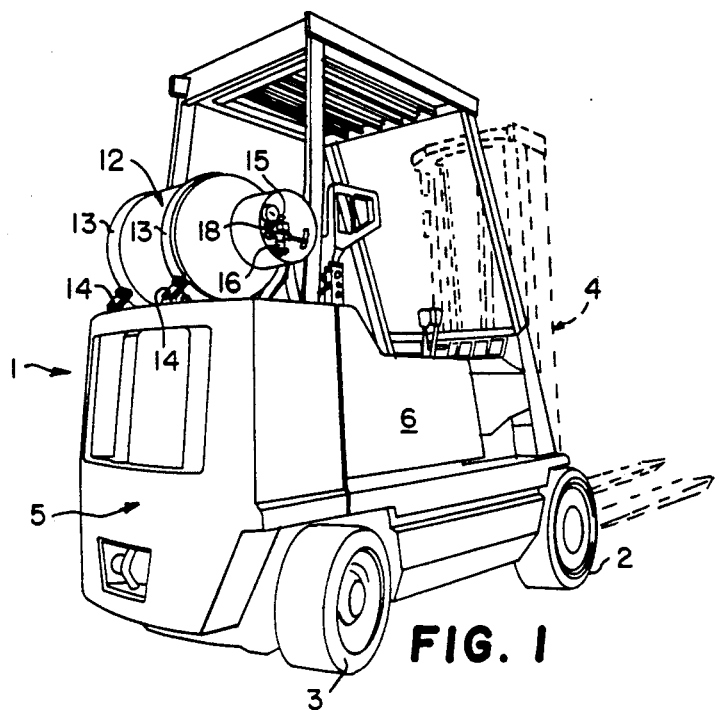
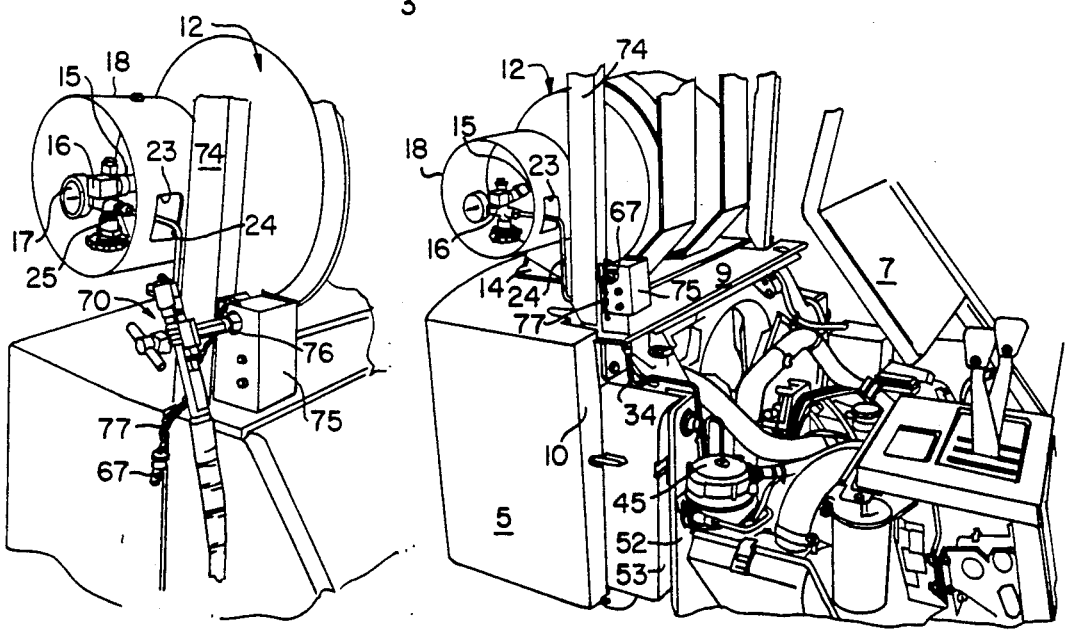
FIG. 1
FIG. 2
FIG. 3

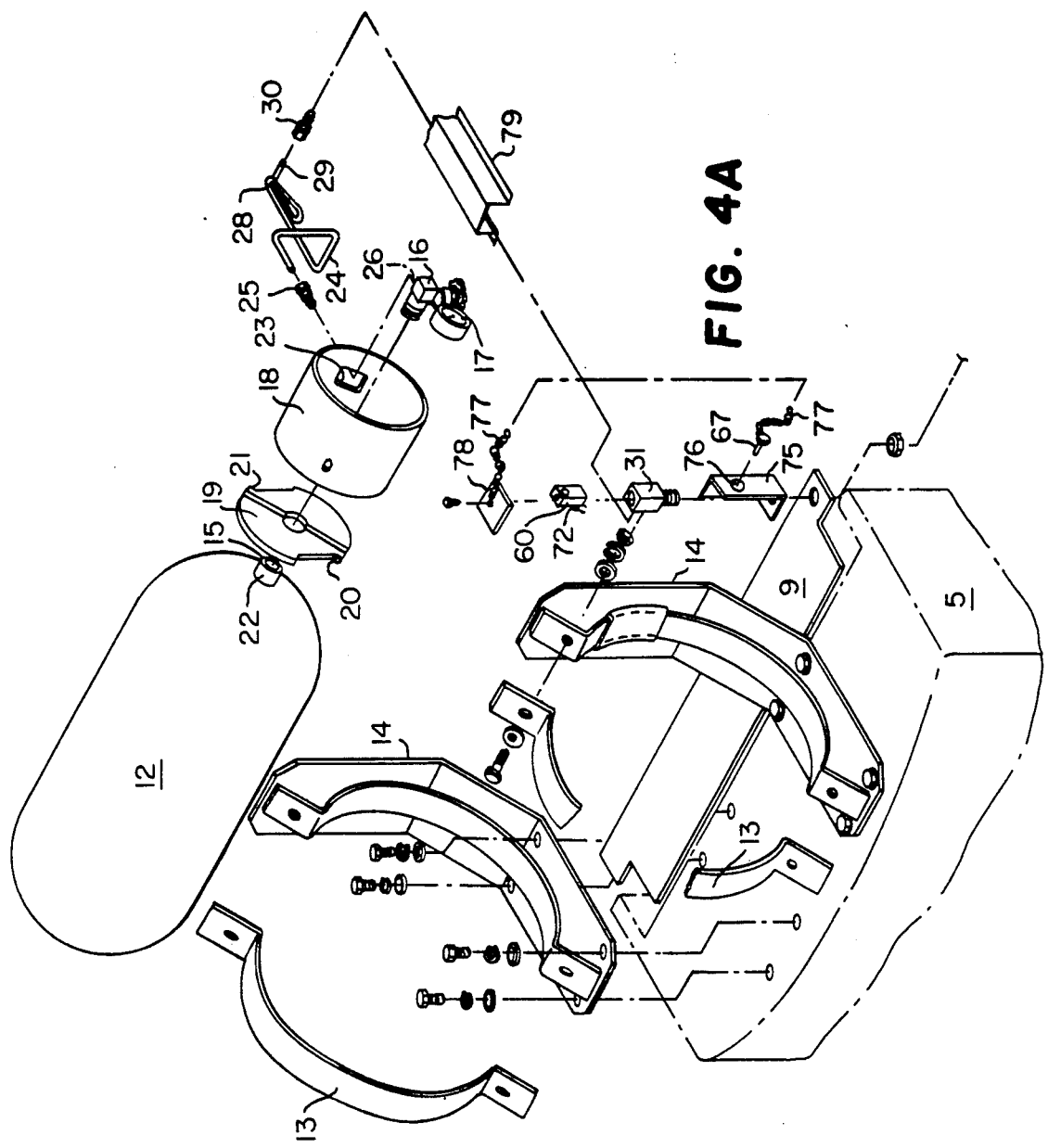

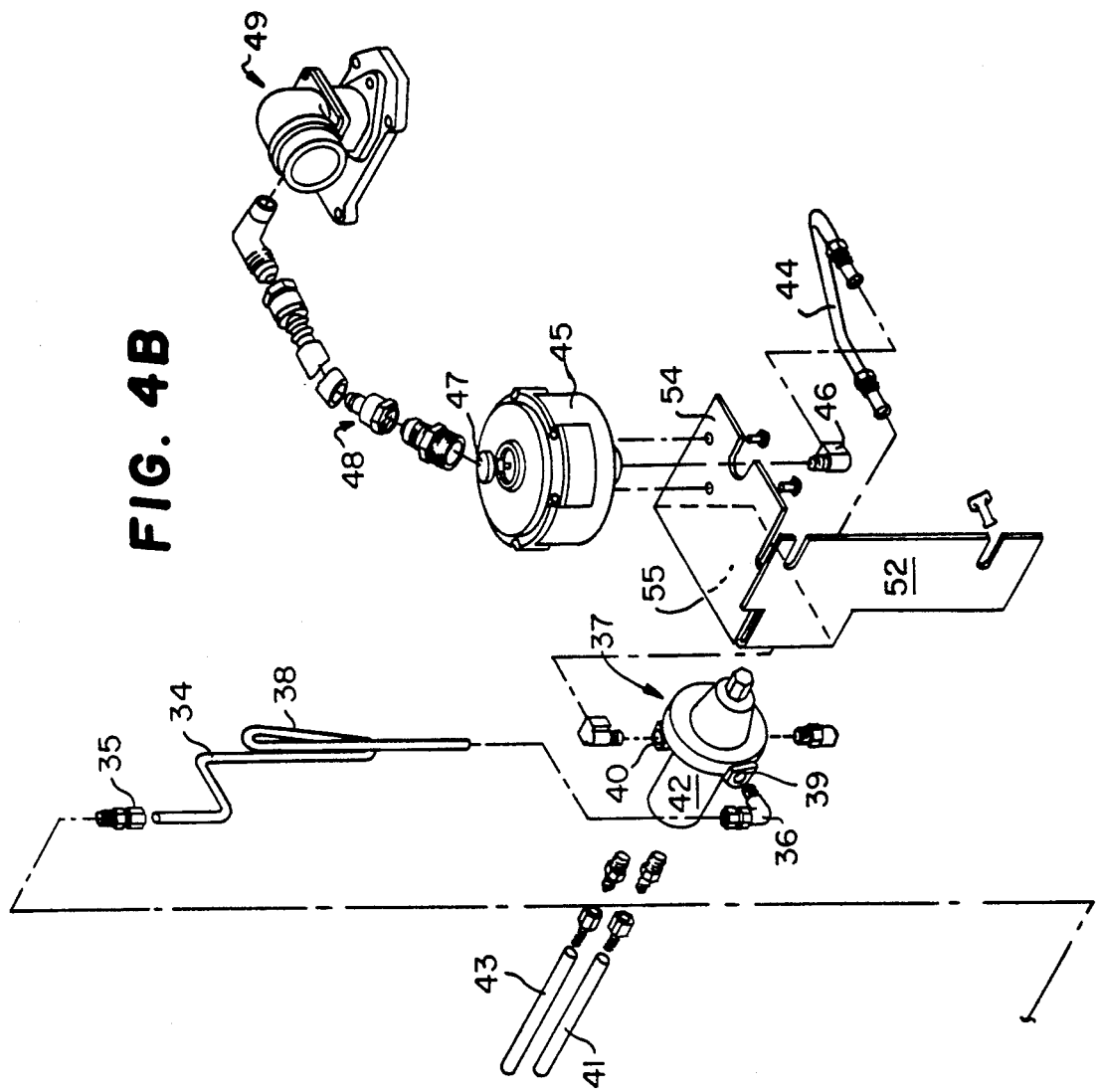

ALTERNATIVE FUEL SYSTEM FOR POWERED INDUSTRIAL VEHICLE

FIELD OF THE INVENTION

This invention relates to an alternative fuel system for a powered industrial vehicle, such as a forklift truck, and more specifically to a compressed natural gas (CNG) fuel system for the internal combustion engine thereof.

BACKGROUND OF THE INVENTION

CNG has recently been reevaluated as an alternative fuel for industrial engines burning gasoline, diesel or liquid propane gas fuels (LPG), especially with an increased emphasis being placed on all off-highway vehicle emissions. The highway vehicles, such as trucks, buses and automobiles have long been using CNG alternative fuels, but because of the fewer total miles or hours of operation, industrial vehicles, such as forklift trucks, have been exempt from the more stringent air quality standards that have applied to highway vehicles. Many workplaces, where off-highway vehicles are used, are now subject to those same standards.

CNG fuel produces substantially lower harmful emission products than gasoline, diesel or LPG. LPG-propelled lift trucks have long been preferred in a closed environment over gasoline or diesel fuel. However, emission tests have shown that the CO levels are 90% higher, and the reactive hydrocarbons (excluding natural gas or methane) are 70% higher in LPG than in CNG. Indoor applications such as in transport terminals and warehouses create difficult air quality conditions. While many warehouses are adequately ventilated, others are not. Trailers are loaded from the rear and when backed into the loading dock of the warehouse, they block off, for much of the time, fresh air which would otherwise enter the building. Environmental authorities, state and federal, are pressing for improvements to be made in the ventilation systems of buildings where powered equipment is used to meet even lower emission levels than is possible with LPG-propelled machines. The cost to industry of upgrading the ventilation system in existing structures is often prohibitive.

For economic reasons, it is expected that CNG as a fuel source will begin replacing, in many instances, the LPG-powered engines, especially in high density, long cycle operations of the type where lift trucks are used and where the existing ventilation system proves inadequate to lower the emission levels to that required by the stricter environmental standards, and upgrading the existing ventilation systems is more costly than converting the lift truck fleet over to an alternative CNG fuel system.

Typically, a single LPG tank for operating a lift truck will hold enough liquid propane to last a normal eight-hour shift, about 33 pounds, without being replaced with a fresh tank. Empty tanks are placed in a rack normally located outside the building, where they are picked up periodically by a service company for recharging.

Unlike propane, natural gas is delivered to the workplace by gas pipeline, since the same natural gas is used also for other purposes, such as heating the building. The local natural gas company will often install a fueling station for the natural gas customer and simply add the service fee to the monthly bill for natural gas which is metered out for the truck fleet as well as for the other natural gas consumption on the premises. A fueling station comprises a compressor, charging cylinders, a control panel and associated equipment for storing and dispensing natural gas under pressure. A station will typically have a standard 12 or 14-foot length of hose connected to a dispensing tower and manifold equipped with pressure gauges and shut-off valve for turning on and off the gas supply. A filling nozzle at the end of the hose is insertable into a refueling receptacle on the truck. The shutoff valve at the manifold is turned on at the dispensing tower and the filling nozzle on the hose inserted into the refueling receptacle of the truck. The nozzle is opened, allowing natural gas under pressure to flow from the dispensing tower into the tank on the truck.

Unlike propane, natural gas is lighter than air and even at high pressure (3000 psi at 70° F.), it remains a gas. As a result, a CNG tank must have a thicker wall, reinforced, usually with wound glass strands. The wall thickness of the tank may be ¼ inch or more. The specifications for such tanks are strictly controlled by the U.S. Department of Transportation (DOT). Tank manufacturers are issued permits by the DOT, and the manufacturing process is subject to periodic inspection, plus the tanks are required to undergo periodic pressure testing.

The outside dimensions of the CNG tank will be about twice those of the typical LPG tank to provide the equivalent amount of fuel capacity to operate a lift truck for a normal eight-hour shift. In terms of usable energy for the normal work cycle of the truck, 670 cu. ft. of natural gas at 3,000 psi and 70° F. equates to about 28 pounds of propane.

One difficulty with CNG systems has been mounting the bulky tank in the limited space available outside the engine compartment on smaller machines, such as compact loaders and lift trucks.

Mounting CNG fuel components inside the engine compartment of a compact vehicle, which for reasons of cost, must ordinarily be designed for the higher unit sales of gasoline, diesel or LPG fuel trucks, is difficult to accommodate in the restricted space environment allowed for these fuel systems. The additional parts of the more complex CNG fuel systems has required mounting not only the tank, but high pressure lines and sensitive components outside the engine compartment. This leaves them exposed to being struck while the vehicle is moving by protruding objects or unstable loads, possibly causing a release of high pressure fuel.

Unlike the LPG fuel system, where the refueling operation comprises replacing the empty tank with a recharged one from a convenient storage rack, in the CNG system the tank remains mounted on the truck and is backfilled with gas under pressure delivered by a nozzle inserted in a refueling valve in the high pressure lines. Fuel supply is not totally interrupted during the refueling of the CNG system, as it is in the case of the tank replacement for an LPG system, hence, it is possible, despite cautions to the contrary, to refuel with the engine running.

SUMMARY OF THE INVENTION

An object of the present invention is to provide a CNG fuel system having high utilization of the lift truck's existing structure for guarding or protecting the components from damage outside of the engine compartment, and having a refilling receptacle that is electrically interlocked with the ignition to prevent refueling while the engine is running.

Another object is to provide a CNG fuel system designed to be installed as either original or after market equipment for compact trucks and loaders manufactured primarily to accommodate gasoline, diesel or LPG fuel systems.

Still another object of the invention is to provide a mounting for a CNG tank on a compact machine, and in the case of a lift truck, for mounting the tank on its side, behind the operator so as not to obstruct the operator's view to the rear, or interfere with the travel of the truck in narrow aisles.

The present invention provides a compact CNG system that addresses these and other objects in a CNG system especially for smaller sized lift trucks. In accordance with a preferred embodiment, a CNG tank is mounted horizontally behind the operator's seat on top of the counterweight. A cylindrical collar is aligned with the axis of the tank, opening sideways and extending out beyond a shutoff valve in the neck opening of the tank, but not so far as to protrude beyond the side of the lift truck and possibly interfere with movement of the truck in narrow aisles, or tight doorways.

The tank valve is aligned with an opening in the collar. A high-pressure line connects through the opening in the collar to the outlet of the tank valve on one end, and is protected by the presence of the overhead guard leg and a conduit until it enters the engine compartment.

Inside the engine compartment, the line leads to a high-pressure first stage regulator that reduces the gas pressure from around 3,000 psi tank pressure to about 125 psi. The body of the regulator has an expansion chamber surrounded by passages connected by hoses to the engine cooling system to counteract the refrigeration effect occurring in the expansion chamber and the resulting freezing of moisture in the lines and adjacent components.

The outlet of the first stage regulator is connected to a second stage regulator in which the gas pressure is further reduced and gas at negative manifold pressure distributed to the engine carburetor.

A bracket is mounted on a lower wall of the engine compartment. The bracket has a mounting surface facing upwardly for securing the second stage regulator and a second mounting surface facing at right angles, laterally of the engine compartment, for mounting the first stage regulator such that the outlet of one is juxtaposed to the inlet of the other and only a short length of tubing is required to connect the two components, thereby providing a more compact subassembly, and better heat transfer within the subassembly to counteract the refrigeration effect. The body of the first stage regulator is perpendicular to that of the second stage regulator so that hoses can connect directly into the end of the first stage regulator and then of the cooling system of the engine.

A refilling receptacle valve has a valve body in which a piston is spring-biased to a normally closed position locking off the escape of tank gas to the atmosphere. A nozzle which delivers gas from a refueling station at tank pressure has a probe inserted into the valve body that sealably engages in internal passageway of the valve body so that gas at refueling pressures unseats the piston to allow the tank to be backfilled.

A microswitch is actuated by the nozzle probe when fully inserted. The normally closed terminals of the microswitch, connected in the ignition circuit, are opened when the nozzle is inserted, disabling the ignition circuit of the truck.

If the engine is inadvertently left running, upon insertion of the nozzle probe into the refilling valve, the interlock with the truck ignition will automatically shut down the engine.

The refilling receptacle takes advantage of existing structures, the overhead guard in particular, which is bolted to the bulkhead at the rear of the engine compartment protecting it being struck by falling loads, or from the side. In this way, the existing structural members of the truck are used in cooperation with the CNG fuel system to conserve space.

The recharging operation will typically take three or four minutes when using a high-recovery dispensing tower. A pressure gauge at the CNG tank outlet registers the tank pressure. When full, the operator shuts off the gas supply at the filling nozzle, and withdraws it from the refilling receptacle, returning the hose to the dispensing tower.

An important aspect, of the invention lies in providing an integrated CNG fuel system for lift trucks which have been designed for gasoline, diesel or LPG fuel systems, the CNG system being designed for optimum utilization of space within the existing engine compartment to accommodate the CNG system as original equipment, or the aftermarket installation. In addition, a mounting arrangement for the CNG tank on the back of the lift truck is provided that positions the tank so that despite the larger CNG tank, the operator's vision to the rear in which direction the lift truck is operated a good part of the time, is not impaired.

The parts of the system extending outside of the engine compartment, including the shut-off valve and pressure gauge in the neck of the CNG tank, are guarded. The cylindrical collar acts as a barrier for the shut off valve and gauge. The refilling valve is enclosed and located in the proximity of the guard leg extending to protect this high pressure component. The lines otherwise exposed outside of the engine compartment are protected from being struck by a tunnel or conduit.

The above and other objects, features and advantages of the invention will become more apparent from the following description and the appended claims taken in conjunction with the accompanying drawings.

BRIEF DESCRIPTION OF THE DRAWINGS

FIG. 1 shows a right rear perspective elevational view of a small sized industrial lift truck, specifically a cushion tired, sit-down, rider, counter-balanced lift truck, of the type to which the invention preferably pertains, on which is mounted a tank containing compressed natural gas (CNG) for propelling the truck;

FIG. 2 is a partial side perspective view of the lift truck in FIG. 1 showing the hose nozzle inserted in the refilling receptacle housing and the nozzle being actuated in recharging compressed natural gas into the tank on the truck from a dispensing tower (not shown);

FIG. 3 is a partial side perspective view of the truck in FIG. 1 showing the engine compartment underneath the raised seat deck with the internal CNG system components shown mounted on a lower bulkhead section of the engine compartment;

FIGS. 4A and B are an exploded view of the CNG system for the lift truck in FIGS. 1–3; FIG. 5A being a rear elevational view of the valve body within the receptacle housing pictured in FIG. 2; 5B is a left side elevational view showing the position of the microswitch mounted on the valve body; and 5C is a mirror image cross-sectional view of the valve body in FIG. 5B.

DESCRIPTION OF THE PREFERRED EMBODIMENT

Figure 5A:
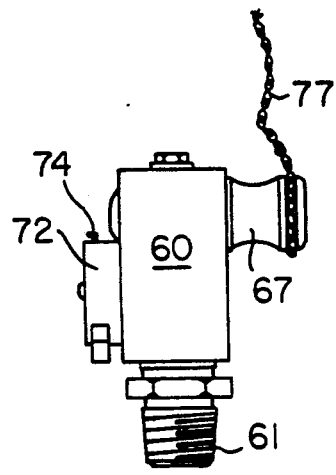
FIGS. 5A, B and C are details of the refilling receptacle.
Figure 5B:
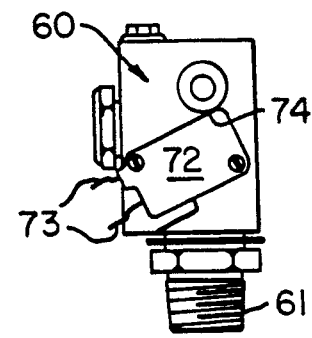

The invention is described hereinafter by way of a preferred embodiment as shown in the drawings, and specifically with respect to a smaller sized forklift truck of about 5,000 pounds lift capacity; however, it will be appreciated that the invention is broader in scope and pertains to an alternative fuel system for other types of self-propelled vehicles where space on the vehicle and in the engine compartment is limited.

Referring to FIG. 1 a lift truck (1) is propelled by drive wheels (2) in front and steered from the rear by steer wheels (3) while maneuvering and positioning pallet loads raised and lowered on the forks of the truck carried on an extendable mast (4). The body of the lift truck includes a counterweight structure (5) at the rear, which counterbalances the load lifted by the mast (4). A side door (6) is hinged along the front edge and may be swung out of the way and the seat deck (7) raised, as in FIG. 3. A bulkhead extension plate (9), attached to the bulkhead (10) at the rear of the engine compartment, mates with the deck (7) when closed.

A tank (12) containing compressed natural gas is mounted on top of the counterweight structure (5) by means of straps (13) encircling the cylindrical body portion of the tank and firmly clamping it to mounting legs (14) bolted to the counterweight structure. The tank is constructed of deep-drawn, seamless, steel reinforced with glass fibers producing a wall thickness of approximately ¼" to withstand the internal gas pressure of up to 3,000 psig. Since compressed natural gas (CNG) at sea level and ambient temperature of 70° remains a gas at 3,000 psi, unlike propane, which is liquified at these conditions, the manufacture of a CNG tank is strictly controlled under the U.S. Department of Transportation (DOT) specifications and quality control. For example, CNG tanks of various sizes may be obtained from Pressed Steel Tank Company in Milwaukee, Wis., a certified DOT manufacturer. In order to obtain the fuel capacity required for a normal eight-hour shift, or the equivalent of about 5½ gallons of gasoline, or 33 pounds of liquid propane (LPG), the size of the tank (12) must be about twice the size of a standard propane tank in terms of overall dimensions. The tank in the case of a 5,000 pound lift truck, as illustrated in FIG. 1 is approximately 32" along its longitudinal axis, and is approximately 16" in diameter, across the cylindrical body portion, creating an internal volume of 4,455 cubic inches (73.18 liters) and weighing about 105 pounds (75 kilograms). This tank will have a capacity of about 670 cubic feet of natural gas under 3,000 psi at 70° F.

Referring to FIGS. 4A and 4B, a shutoff valve (16) is threaded into the mouth (15) of the tank in the neck (22). A pressure gauge (17) communicates upstream or above the shutoff in the chamber of valve (16) for registering the pressure in the tank (12) at all times. A cylindrical collar (18) is aligned with the axis of the tank and is bolted or otherwise firmly secured to a clamping ring (19) which has mating halves drilled and tapped at (20), (21) for securing it onto the neck (22) of the tank so that the collar (18) is in firm cylindrical engagement with the semi-spherical end of the tank. The collar extends laterally to surround the shut-off valve (16), and gauge (17), but not beyond the side plane of the lift truck. The collar (18) has an opening (23) through which a high-pressure line (24) extends. A fitting (25) threads into a right angle opening (26) communicating in the body of the shutoff valve (16) downstream or below the seat in the valve chamber.

The high-pressure line (24) is coiled, or looped at (28) to attenuate vibrations. It connects at the opposite end (29) to a fitting (30) threaded into a t-bulkhead fitting (31), the body of which has a cross passage at right angles opening down where a second high-pressure line (34) is connected by a fitting (35) to the lower outlet of the bulkhead fitting (31). At the opposite end of the line (34), an elbow (36) is connected to the inlet (39) to a high-pressure regulator (37). The line (34) also has a loop (38) intermediate the fitting (35) and elbow (36) to take out additional vibrations. The regulator (37) is a known type of industrial vehicle regulator which converts the 3,000 psig gas pressure at the inlet (39) to 125 psi at the outlet (40). Hoses (41, 43) connect to the cooling system of the engine to deliver hot fluid to the body (42) of the regulator, circulating engine coolant at approximately 180° F. around passages surrounding the regulator nozzle and decompression chamber to prevent freeze-up. A regulator suitable for use in the system in accordance with the preferred embodiment of the invention is available from Modern Engineering Company in St. Louis, Mo., and is referred to as a Type P, NGV Regulator with Enviroal-cap, Model No. 8433. Gas from the outlet (40) is delivered by line (44) to a second stage regulator (45). Gas outlet pressure from the first stage regulator enters the second stage regulator at the bottom through elbow (46) secured on the end of line (44). The regulator (45) is of the same type used in liquid propane fuel systems known as an OHG Model X-2 sold by the OHG Corporation in Santa Fe Springs, Calif., the operation of which is generally known, that is, it delivers gaseous fuel in the properly metered proportions to the engine carburetor (49) for mixing with air in the optimum proportions for the emission and performance requirements of the engine. The regulator (45) functions as both a lock-off and decompression chamber such that when the engine is shut off, and there is no vacuum to hold the valve open, the diaphragm internally of the regulator locks off the fuel pressure entering the regulator in a known manner.

A feature of the invention with particular application in compact vehicles having limited space in the engine compartment is the mounting bracket (52) which bolts to the bulkhead section (53) (see FIG. 3). A horizontal upper surface (54) is provided for mounting the second stage regulator (45) while on the same bracket (52) a right angle surface (55) faces inwardly, providing a mounting for the high-pressure regulator (37). Placing the regulators (37) (45) at ninety degrees to each other helps with space utilization in strict confines of the engine compartment. The hoses (41) (43) can reach the body (42) directly without having to bend in a ninety degree path. In addition, the bracket serves as a solid mounting structure and heat transfer member for the hoses and lines connected to the subassembly of regulators 37, 45, for more uniform counteraction of the refrigeration effect.

Figure 5C:
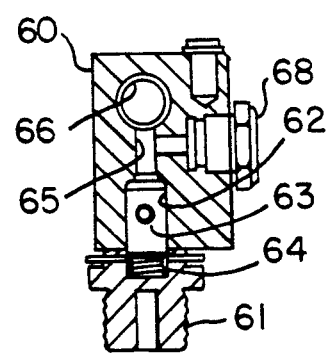

Referring to FIG. 4A, a refilling valve body (60) is threaded into the upper end of the bulkhead fitting (31) at its lower end. The valve body (60) has a valve chamber (62), FIG. 5C, in which a piston (63) is biased by spring (64) to a normally closed position with the passageway (65) communicating at right angles with a refilling receptacle passageway (66) which is normally closed by the dust plug (67), shown in FIG. 5A. A blow-off vent (68) connects with the passageway (65) in the case of an over-pressure situation. The dust plug (67) is removed and a hose nozzle (70) (see FIG. 2) is inserted in the filling receptacle passageway (66), when refilling the tank 12. A shutoff valve at the nozzle (70), is manually opened releasing gas at high pressure for filling the tank (12) from a fuel dispensing tower (not shown) of the filling station. The gas pressure unseats the piston (63) against the force of spring (64), allowing gas to enter the upper end of the bulkhead fitting (31) and flow in reverse direction through the line (24), to the tank (12). A microswitch (72) (see FIG. 5A, B) has leads (73) which are wired into the ignition circuit of the truck so as to interrupt the circuit, when the nozzle (70) in inserted. So long as the nozzle (70) is fully inserted in the refueling receptacle passageway (66), the microswitch (72) is held open by the end of the nozzle engaging the switch actuator (74).

Referring to FIG. 4A, the bulkhead fitting (31) forms a bulkhead connection with the first and second high-pressure lines (24) (34) and the refilling valve (60) in the bulkhead extension plate (9). This assembly is protected within a housing (75) from being struck by objects protruding in the aisle or by falling loads. An aperture (76) in the side of housing (75) facing the right facing forward aligned with the refilling valve body passageway (66) of the refilling valve (60), and is normally closed by the dust plug (67) which is shown tethered by a chain (77) in FIG. 2 to the top plate (78) of the housing (75).

It will be appreciated from the foregoing description that according to the present invention, natural gas flows through the line (24) where it is decompressed by the high-pressure regulator (37). Since the high-pressure regulator is located near the CNG tank (12), the length of the high-pressure line is substantially shortened, decreasing the possibility of rupture or loosening of the fittings due to vibration.

When the engine compartment is completely buttoned up, as it would be during normal operation or refueling, it is virtually impossible for the high-pressure lines to be damaged because the configuration of the lift truck itself is taken into account in designing the CNG system. The overhead guard (74) has a right rear leg that provides a pillar guarding against protruding objects in the aisle striking the exposed portion of the fuel line (24) (FIG. 3). The line (24) comes out of tank (12) directly downward after passing through opening (23) in the collar (18). The line is bent ninety degrees and routed along the top of counterweight (5) to the connection (30) with the bulkhead fitting (31). It is covered by a guard tunnel (79) (FIG. 4A) integral with the housing (75) that prevents damage to the line by heavy objects accidentally being dropped on it or the operator stepping inadvertently on the line. The line runs immediately behind the overhead guard leg (74) before taking a path along the surface of the counterweight behind the leg (FIG. 3) and thence inside the tunnel (79) behind the leg, and around to the opposite side to enter the bulkhead fitting (31) from the rear.

Of course, such precautions may be unnecessary, in many applications; however, fork lift trucks encounter a variety of workplace hazards. For example, in traveling between narrow aisles, or through tight doorways in reverse, an unseen protruding object could easily rip off an otherwise unprotected high-pressure line. Since fork lift trucks operate in reverse much of the time, the collar (18) clamps solidly onto the neck (22) of the tank to protect the line (24), the shutoff valve (16) and gauge (17). A short length of the high-pressure line (24) lays close to the rear of the guard leg such that it is virtually integral with it, and is protected by it. The housing (75) and guard tunnel (79) cooperates with the guard leg to protect the line (24) from being struck from above. Should a leak nonetheless be caused by accidental impact directly to the high-pressure line at the only very short exposed section, the leak occurs outside of the engine compartment and behind the operator. Since natural gas is lighter than air, it is quickly dissipated, rather than being trapped inside the engine compartment. Once the high-pressure gas line enters the engine compartment below the bulkhead extension plate (9), line (34) is protected by the seat deck (7) and the side door (6) so that it is not possible for any falling object to strike the line or the components (37) (45).

The compact arrangement takes part of its advantage from the bracket (52) which also enhances the heating effect by locating the components (37, 45) in close proximity. The expansion of the gas takes place in these components, with accompanying cooling effect. This is more efficiently counteracted due to heating of these parts promptly after starting the engine by lines (41, 43). The gas is maintained at a uniform temperature by the heat transferred through the bracket (52) to the regulators (37) (45) preventing freezing up of the lines, nozzles and associated parts. The mounting bracket (52) bolts to the bulkhead section (53) which, in part, provides a heat sink for the rear mounted radiator (not shown) and functions as a source of heat transferred tot he bracket (52) to assist in the vaporization of the CNG fuel.

While these and other advantages will become more apparent in reference to the aforementioned description of the preferred embodiment of the invention, it will be appreciated that additional objects, features and advantages of the invention may take other forms without departing from the scope of the invention as defined in the appended claims.

What is claimed is:

1. In a material handling industrial vehicle having an engine within an engine compartment, a compressed natural gas (CNG) fuel system for the vehicle providing a source of fuel to the engine in propelling the vehicle and powering its material handling systems; the improvement comprising:

a CNG tank mounted near the engine compartment;
a first fuel line section extending from the CNG tank;
a second fuel line section extending to the engine compartment and connected to the engine;
refilling means outside the engine compartment interconnecting the first and second fuel line sections comprising a refilling valve having a valve chamber, a valve element normally biased to the closed position in the chamber, and communicating one side through a passageway with said first and second fuel line sections, a refilling passageway communicating with the valve chamber on the other side of the valve element, whereby nozzle means can be inserted in the refilling passageway, supplying compressed natural gas at a pressure sufficient to unseat the valve element, causing gas under nozzle pressure to flow through said first fuel line section, recharging the CNG tank;

an ignition circuit including an electrical switch means, having a normally closed position, connected in the ignition circuit to the engine; and an element connected with the electrical switch means actuated when the nozzle means is inserted in the refilling passageway to open the normally closed electrical switch means, disabling the ignition circuit of the vehicle.

2. The improvement as set forth in clam 1, wherein the industrial vehicle is a lift truck having an extensible mast for raising and lowering and maneuvering loads transported by the truck, an overhead guard protecting the operator from falling objects;

structure of the overhead guard including a lower portion of one support leg thereof secured to a portion of the truck body;

said refilling valve mounted to said portion of the truck body adjacent said lower leg portion of the overhead guard;

a housing comprising top and side wall elements surrounding on three sides the refilling valve and in cooperation wit the lower guard leg protecting it from damage from falling objects or being struck when the truck is maneuvered through narrow aisles or doorways.

3. The improvement as set forth in claim 2 wherein the refilling valve includes a valve body containing said valve chamber, a passageway communicating with sad chamber, and the first and second fuel line sections, said refilling passageway at right angles to and communicating with said first passageway, said valve element comprising a piston spring-biased in the closed positions shutting off communication between said passageway and the refilling passageway, a removable plug normally closing the refilling passageway tethered to said housing, an opening in said housing wall aligned with said refilling passageway, through which the plug is inserted for closing said refilling passageway in normal use, and withdrawn when inserting the nozzle for refilling the CNG tank.

4. The improvement set forth in claim 3 wherein said switch means is a microswitch mounted on said refilling valve body having an actuator operatively engaged by said nozzle means when inserted in said refilling passageway to open the switch contacts interrupting the ignition circuit so long as the nozzle means is inserted.

5. The improvement as set forth in claim 4 wherein said guard leg portion provides a pillar adjacent which a portion of said first fuel line section travels to protect it from damage.

6. In a lift truck having an engine, an engine compartment for the engine, a CNG fuel system for propelling the truck, a tank containing compressed natural gas (CNG) mounted horizontally outside the engine compartment, an overhead guard having a vertical rear leg structure situated between the tank and the engine compartment, a fuel line extending from the tank into the engine compartment to a first regulator, said first regulator decompressing said gas from tank pressure to some lower pressure by means of expansion therein, causing a refrigeration effect in the regulator and to surrounding parts;

hose means connecting engine coolant to said regulator for counteracting the refrigeration effect by means of circulating hot fluid to the regulator;

a second regulator communicating with the first regulator for metering a uniform flow of gas to the engine and further decompressing said gas to a pressure required for efficient combustion in said engine;

the improvement comprising:

a bracket having a vertical mounting surface for the first regulator, a horizontal surface for mounting the second regulator so that its position is at approximately 90 degree angles to the first regulator in the engine compartment, said first regulator positioned to align with the hose means and thereby reduce the hose routing and conserve engine compartment space;

said tank having a neck;

a valve in the neck of the tank manually operated to shut-off a flow of gas from the tank;

a cylindrical collar having an end circumjacent the neck of the tank removable securing the collar integral with said neck, said collar extending laterally and surrounding said valve and having an opening in alignment with the fuel line through which the fuel line extends from said valve, and then routing behind said rear leg of the overhead guard;

a refilling valve mounted outside the engine compartment adjacent said rear leg of the overhead guard;

a housing means partially enclosing said refilling valve; and an elongated conduit means extending from said housing means providing a tunnel taken by said fuel line in reaching the refilling valve providing guarding, in conjunction with the rear leg of the overhead guard against objects striking fuel line exposed outside of the engine compartment.

7. The improvement as set forth in claim 6 wherein said bracket means for mounting the regulators includes a flat surface portion, and a rear wall of the engine compartment to which said flat portion is secured.

8. The improvement as set forth in claim 7 wherein said rear wall of the engine compartment is a source of heat transferred to the bracket to assist in vaporization of the CNG fuel.

9. The improvement according to claim 7 wherein a pair of mounting brackets secured to the lift truck behind an operator's compartment have detachable straps extending partially around the tank for securing it in a removable fashion in a horizontal position on the rear of the truck.

10. The improvement according to claim 9 wherein said housing for the refilling valve has an opening facing to one side of the truck providing access to the valve when refilling.

11. The improvement according to claim 10 wherein a microswitch has a switch element engaged by the refilling nozzle when inserted in the refilling valve, said microswitch being electrically connected in an ignition circuit such that it is opened form its normally closed position when inserting the refilling nozzle, thereby preventing ignition from occurring until the refilling nozzle is withdrawn.

12. A lift truck having an engine compartment, an engine in the compartment, a counterweight behind the engine compartment, a compressed natural gas (CNG) system for said engine comprising:
a CNG fuel tank mounted horizontally on the counterweight having an outlet on one end facing a side of the truck;
a pair of mounting brackets removable securing the tank on the counterweight;
collar means including clamping means securing said collar means to the outlet of the tank and extending circumjacent therefrom horizontally to the side of the lift truck;
manually operated valve means in the outlet of said tank encircled by sad collar means;
an opening in said collar means;
a first fuel line extending from said valve means through said opening in the collar means and along the surface of the counterweight;
a second fuel line extending into the engine compartment and connected to the engine;
and a refueling valve outside the engine compartment interconnecting the first and second fuel lines having a valve chamber,
a valve element biased toward a closed position in the chamber shutting off fuel from the first to the second fuel line,
a refilling passageway communicating with the valve chamber whereby a refilling nozzle may be inserted in the refilling passageway, supplying compressed natural gas at a pressure sufficient to unseat the valve element, causing gas to back flow in the first fuel line recharging the tank an ignition circuit including an electrical switch means, having a normally closed position, connected in the ignition circuit to the engine; and an element connected with the electrical switch means acutated when the nozzle is inserted in the refilling passageway to open the normally closed electrical switch means, disabling the ignition circuit of the vehicle.

* * * * *